United States Patent [19]

Agranat et al.

[11] Patent Number: 5,258,934
[45] Date of Patent: Nov. 2, 1993

[54] CHARGE DOMAIN BIT SERIAL VECTOR-MATRIX MULTIPLIER AND METHOD THEREOF

[75] Inventors: Aharon J. Agranat; Charles F. Neugebauer, both of Pasadena; Amnon Yariv, San Marino, all of Calif.

[73] Assignee: California Institute of Technology, Pasadena, Calif.

[21] Appl. No.: 522,772

[22] Filed: May 14, 1990

[51] Int. Cl.$^5$ .......................... G06G 7/16; G06J 7/12
[52] U.S. Cl. ..................................... 364/606; 364/807; 364/862; 364/844
[58] Field of Search ............... 364/602, 606, 607, 604, 364/608, 807, 825, 862, 819, 844; 340/347 DA; 341/347 AD, 172; 357/24; 377/57, 63

[56] References Cited

U.S. PATENT DOCUMENTS

| | | | |
|---|---|---|---|
| 4,063,200 | 12/1977 | Mattern | 364/862 |
| 4,120,035 | 10/1978 | Cases et al. | 364/825 |
| 4,126,852 | 11/1978 | Baertsch | 340/347 AD |
| 4,161,783 | 7/1979 | Wrench, Jr. et al. | 364/606 |
| 4,316,258 | 2/1982 | Berger | 364/825 |
| 4,458,324 | 7/1984 | Burke et al. | 364/606 |
| 4,464,726 | 8/1984 | Chiang | 364/606 |
| 4,625,293 | 11/1986 | Voselsong et al. | 364/606 |
| 5,008,833 | 4/1991 | Agranat et al. | 364/807 |
| 5,089,983 | 2/1992 | Chiang | 364/841 |
| 5,113,365 | 5/1992 | Yang | 364/807 |

OTHER PUBLICATIONS

Semi-Parallel Microelectronic Implementation of Neural Network Models Using CCD Technology, Electronics Letters, vol. 23, No. 11, pp. 580-581, May 21, 1987.
Parallel Optoelectronic Realization of Neural Network Models Using CID Technology, Applied Optics, vol. 27, p. 4354, Nov. 1 1988.
A 100MS 16-Point CCD Cosine Transform Procesor by Chiang et al, p. 306 of the technical papers of the Feb. 27, 1987 IEEE International Solid-State Circuits Conference.

Primary Examiner—Jerry Smith
Assistant Examiner—Jim Trammell
Attorney, Agent, or Firm—Leonard Tachner

[57] ABSTRACT

A charge domain bit serial vector matrix multiplier for real time signal processing of mixed digital/analog signals for implementing opto-electronic neural networks and other signal processing functions. A combination of CCD and DCSD arrays permits vector/matrix multiplication with better than $10^{11}$ multiply accumulates per second on a one square centimeter chip. The CCD array portion of the invention is used to load and move charge packets into the DCSD array for processing therein. The CCD array is also used to empty the matrix of unwanted charge. The DCSD array is designed to store a plurality of charge packets representing the respective matrix values such as the synaptic interaction matrix of a neural network. The vector multiplicand may be applied in bit serial format. The row or sensor lines of the DCSD array are used to accumulate the results of the multiply operation. Each such row output line is provided with a divide-by-two/accumulate CCD circuit which automatically compensates for the increasing value of the input vector element's bits from least significant bit to most significant bit. In a similar fashion each row output line can be provided with a multiply-by-two/accumulate CCD circuit which automatically accounts for the decreasing value of the input vector element's bits from most significant bit to least significant bit. The accumulated charge packet output of the array may be preferably converted to a digital signal compatible with the input vector configuration by utilizing a plurality of analog-to-digital converters.

12 Claims, 5 Drawing Sheets

CHARGE DOMAIN BIT SERIAL VECTOR-MATRIX MULTIPLIER AND METHOD THEREOF

TECHNICAL FIELD

The present invention pertains generally to charge domain circuits, and more specifically to a combined charge-coupled device and distributed charge sensing device for carrying out vector-matrix multiplication, a computation process which is particularly advantageous for use in implementing the discrete linear transform, as well as in other signal processing applications.

BACKGROUND ART

The concept of the discrete linear transform (e.g. Fourier Transform, Chirp-Z Transform, Hartley Transform) is central to the signal processing industry. Discrete (i.e. sampled) signals are represented by the vector V $$v = (v_1, \ldots v_j, \ldots v_N)$$

whose elements (N in all) are the temporal or spatial samples of the input signal. The discrete linear transform (DLT) is performed by computing a vector-matrix multiplication, where the input vector contains the input signal and the resultant vector contains the transformed signal. The square matrix (N by N) contains the transform information—for example, in a Discrete Cosine Transform, the matrix is simply a cosine matrix:

$$W_{ij} = \cos(i^*j^*\pi/N)$$

and the calculation is:

$$U_i = \Sigma_j W_{ij} * V_j$$

All DLT's can be represented in the form of the simple vector-matrix multiplication above. In practice, however, implementations of DLT's often take advantage of the symmetry available in the W matrix to reduce the number of multiply-accumulate (MAC) operations (e.g. the FFT algorithm). These symmetries are not available in the general DLT case, giving the FFT and similar algoriths the advantage in terms of total MAC's. General DLT hardware (i.e. a vector-matrix multiplier), however, offers a significant flexibility advantage over a dedicated piece of transform hardware optimized for a single algorithm. A need thus exists for a highly parallel DLT signal processing device useful for implementing general DLT's.

Recently, the field of neural networks (NN) has experienced intensive development. NN theories provide a framework from which general nonlinear transforms can be built. The computation typically involves a vector-matrix multiplication (the bulk of the calculation) and the application of a nonlinearity. Current efforts of NN simulation typically rely on sequential hardware to calculate the vector-matrix multiplication, whereas the task is inherently parallel. Thus it can be seen that it would be highly advantageous to have a signal processing device which provides a high speed, high accuracy method of providing vector-matrix multiplication.

One such device is described in an article by Agranat and Yariv, two of the inventors herein, entitled "*Semi-Parallel Microelectronic Implementation of Neural Network Models Using CCD Technology*" Electronics Letters, Volume 23, Number 11, Pages 580-581, May 21, 1987. A vector-matrix multiplier using the nondestructive readout phase of charge-injection devices (CID's) is disclosed in another article by Agranat, Neugebauer and Yariv, entitled "*Parallel Optoelectronic Realization of Neural Network Models Usinq CID Technology*", Applied Optics, Volume 27, Page 4354, Nov. 1, 1988. The CCD implementation of a vector-matrix multiplier as described in the earlier of the two above-identified articles, contains 65,536 analog matrix elements which can be multiplied by a 256 length vector in a semi-parallel fashion at a rate of roughly $10^9$ multiply-accumulate's per second. The second of the above noted articles describes a truly parallel vector-matrix multiplication scheme. This scheme relies on the nondestructive sensing portion of charge-injection device technology in which each pixel of an N×N two-dimensional CID detector array contains charge in direct proportion to the corresponding values of the interaction matrix W.

A CCD implementation for carrying out a vector-matrix product algorithm is disclosed in an article entitled *A 100MS 16-Point CCD Cosine Transform Processor* by Chiang et al. at page 306 of the digest of technical papers of the 1987 IEEE International Solid-State Circuits Conference. Unfortunately, this implementation is slower and requires more semiconductor "real estate" than would be needed in a practical DLT or other signal processing application. Furthermore, the Chiang et al. scheme is severely limited in its application to general signal processing uses.

A need still exists therefore for practical system integration of such a high speed charge domain signal processor that is faster, larger in scale, has more general application and which provides digital input/output functions so that such signal processors can operate with standard digital memories and communication methods in high speed, high accuracy implementation of vector-matrix multipliers in DLT applications, neural networks and in other signal processing functions.

SUMMARY OF THE INVENTION

The present invention comprises a charge domain bit serial vector-matrix multiplier utilizing mixed analog/digital signal processing that allows the device to operate at relatively high accuracy and to have digital input and output. The processor of the present invention comprises a large CCD array for loading and removing charge packets and which also serves as a large Distributed Charge Sensing Device (DCSD) array for the actual signal processing functions. A DSCD is simply a Charge Injection Device (CID) that doesn't use the charge injection mode of clearing matrix elements. The physical layout of a DCSD is the same as that of a CID—each has row and column lines defining pixels at their intersections. Each charged domain circuit cell of the preferred embodiment of the present invention which computes a multiply and accumulate function, contains four electrodes and one buried channel diffusion. All four of the electrodes are associated with the CCD loading structure, which comprises a typical four phase CCD for moving charge along the channel in a conventional manner. However, two of the four CCD electrodes are also used for DCSD operation, namely, the vector-matrix multiply function. Thus these two electrodes serve a dual function and therefore reduce chip real estate requirements.

The CCD is used to initially load the circuit with the matrix of charge encoding the weight matrix W. This process may be done optically, such as described in the Nov. 1, 1988 article mentioned above by using a spatial light modulator. The CCD structure may be used to flush all old charge out of the matrix prior to illumination. Alternatively, the CCD can use electrical input, the entire array being demultiplexed through one or more analog input pins. Compact systems are possible with a single EPROM chip and digital-to-analog converter providing the non-volatile matrix storage and loading capability. Once the matrix of charge is in place, two of the CCD clock electrodes in each cell become dormant and the remaining two CCD electrodes, under which the charge is stored after loading, assume the function of the vertical and horizontal address lines of the DCSD array.

Prior to the multiplication process taking place, the horizontal lines or rows of the DCSD structure are all preset to a fixed reference voltage and then left floating so that all of the matrix charges are initially stored under the column electrodes of all the elements or pixels in the DCSD matrix. The vector-matrix multiply function is then initiated by applying vector element voltages to the column lines of the DCSD array in a pulsed format. The entire vector-matrix multiply operation is computed in a single clock cycle with the result manifested as analog voltage changes on the row line of the DCSD array with each row line corresponding to an output vector element.

One of the highly advantageous and novel features of the present invention is the application of the input vector elements in a digital form comprising 2-12 bits starting with the least significant bit and ending with the most significant bit. In order to compensate for the change in value of the input vector bits (by a factor of 2) as the process advances through bits of higher value in the vector input elements, the rows of the DCSD array are provided with a charge domain divide-by-two/accumulate circuit. Accordingly, for subsequent bits of the input vector, the results of the previous computation are divided in half and added—this process is repeated for all bits of the input vector which results with the n'th bit result being divided by a factor of $2^n$. The analog charge output of the DCSD array may be then readily converted to a binary stream utilizing a bit serial analog-to-digital converter so that the output vector is of the same format as the input vector, namely, digital.

OBJECTS OF THE INVENTION

It is therefore a principal object of the present invention to provide a mixed analog/digital signal processing integrated circuit utilizing charge domain technology to provide a high accuracy, high speed vector-matrix multiplier.

It is an additional object of the present invention to provide a CCD/DCSD signal processor for vector-matrix multiplication such as that which can be used in optoelectronic neural networks for updating each neuron in relation to the total input that flows into it in accordance with the strength of interconnection synapses given by a synaptic interaction matrix.

It is still an additional object of the present invention to provide a vector-matrix multiplication signal processor using charge domain circuitry in which analog matrix elements are loaded into a DCSD array (similar to a CID array) by means of a CCD loading structure wherein the matrix elements are manifested by charge packets positioned at each pixel of the DCSD array and furthermore, wherein the multiplying vector elements are input as digital numbers in bit serial form and the product thereof is accumulated at the output of the DCSD array as charge packets which may be converted to a digital number by an analog-to-digital converter.

It is still an additional object of the present invention to provide a bit serial vector matrix multiplier using a DCSD array, the rows of which are provided with divide-by-two/accumulate circuits to compensate for the increasing value of vector element bits applied to the DCSD array for multiply and accumulate operations using analog matrix values stored at pixel locations within the array.

BRIEF DESCRIPTION OF THE DRAWINGS

The aforementioned objects and advantages of the present invention as well as additional objects and advantages thereof will be more fully understood hereinafter as a result of a detailed description of a preferred embodiment when taken in conjunction with the following drawings in which.

DETAILED DESCRIPTION OF A PREFERRED EMBODIMENT

Figure 1:
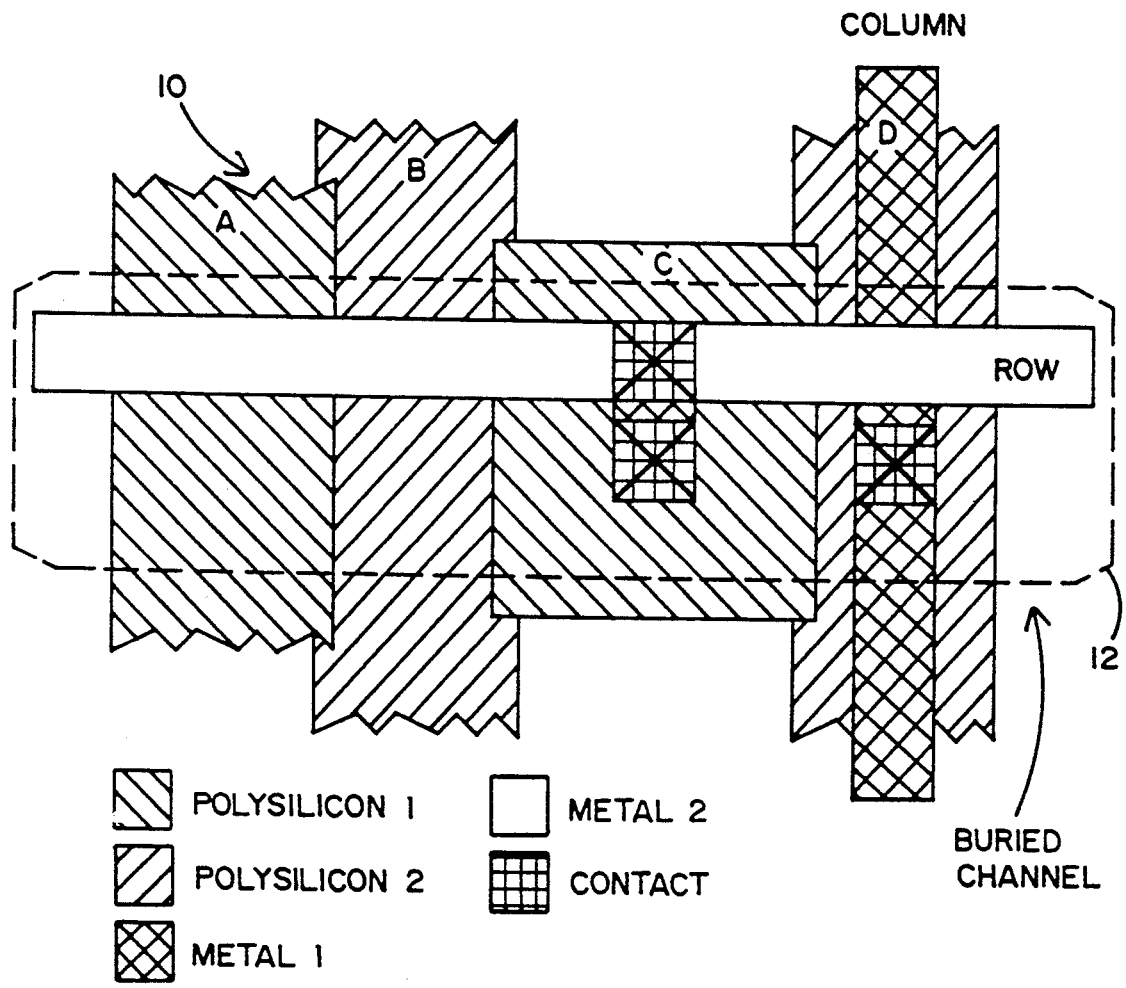
FIG. 1 is a schematic representation of the physical layout of a CCD/DCSD multiplyer cell of the present invention.

Reference will now be made to FIG. 1 of the accompanying drawings which illustrates the geometrical layout of the multiplier cell of the present invention. More specifically, as seen in FIG. 1, the multiplier cell 10 comprises four electrodes A, B, C and D and one buried channel diffusion 12. Two of the electrodes, namely, those which constitute the row and column electrodes of the DCSD portion of the cell, are made of polysilicon electrodes connected by metal such as aluminum and the remaining electrodes are made of polysilicon material. All four of the electrodes (A, B, C, and D of FIG. 1) are associated with the CCD loading structure which moves charge along the channel from left-to-right as observed in FIG. 1 in a manner that is typical for a four-phase CCD. Operation of a four-phase CCD has been described in a variety of microelectronic text books and need not be described in detail herein. By way of example, see *Microelectronics* by Jacob Millman, page 306-308 and *Charge-Transfer Devices* by G. S. Hobson, page 23-25.

The CCD portion of the multiply cell of the present invention is used for loading and charge flushing only and is not used during the multiply operation. However, two of the electrodes of the CCD, namely, those two which are made of polysilicon and connected by metal (electrodes C and D of FIG. 1) as opposed to only polysilicon, are used for the DCSD operation (the vector-matrix multiplying operation), thus serving dual functions and saving space. Initially, the CCD is used to load the array of cells with a matrix of charge encoding the weight matrix which may, for example, be a synaptic interaction matrix wherein each matrix value represents the strength of a connection between two neurons. The loading process can be accomplished optically during which the CCD structure is used to flush all old charge out of the matrix prior to illumination. In addition, the CCD can use electrical input, the entire array being demultiplexed from one or more analog input pins. Compact systems are possible with a single EPROM chip and digital-to-analog converter (DAC) providing a non-volatile matrix storage and loading capability.

Once the matrix of charge is in place, two of the CCD clock electrodes (A and B of FIG. 1) become dormant. The remaining two CCD electrodes preferably connected from cell to cell by metal, and under which the charge is stored after loading, assume the function of the vertical and horizontal address lines of the DCSD array. The DCSD array is essentially a CID array that is only used in the nondestructive readout phase. The combined CCD within each cell obviates the need for change injection as a form of charge removal.

Figure 2:
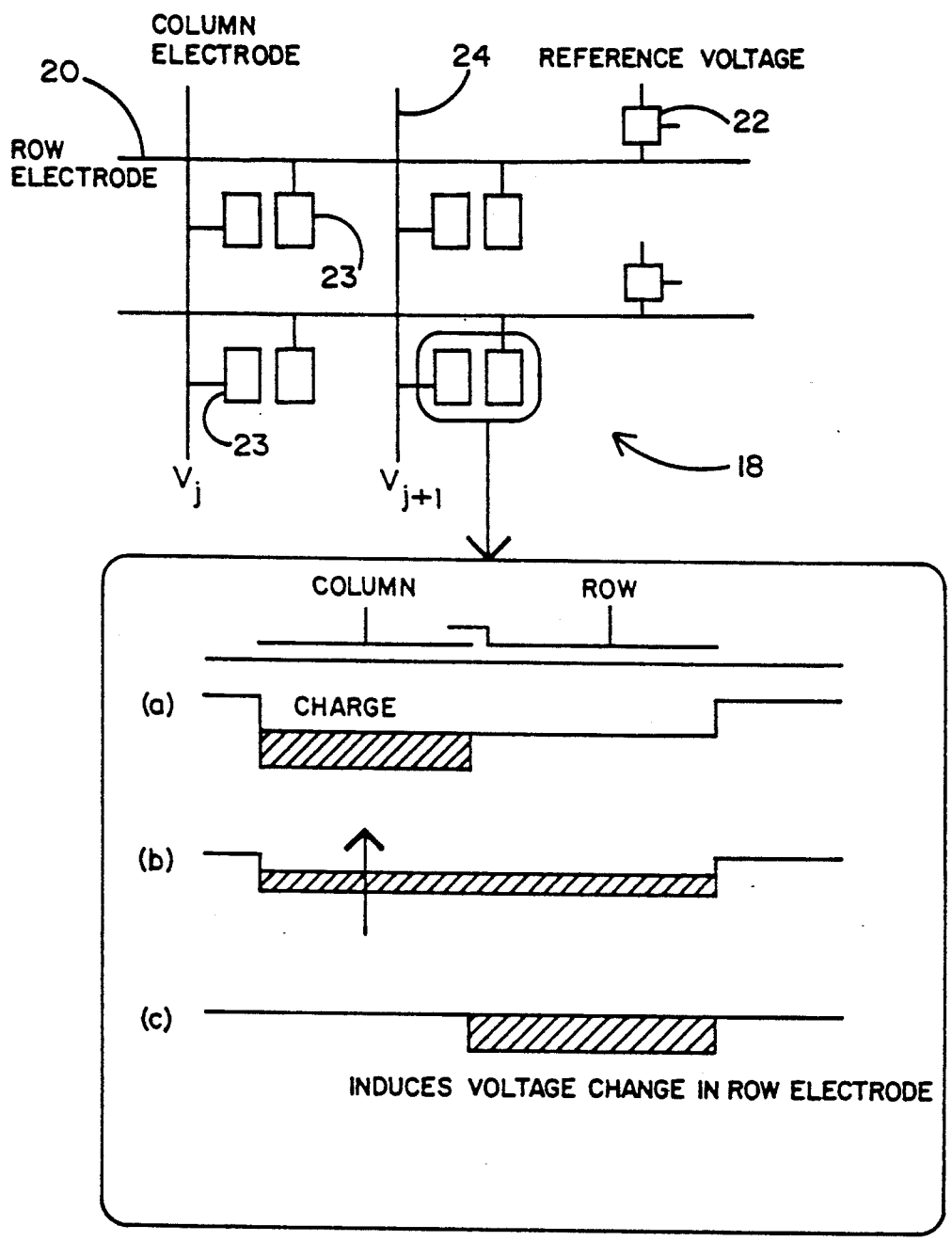
FIG. 2 is a graphical representation of the DCSD operation of the present invention.

A representative portion of the DCSD array 18 is shown schematically in FIG. 2. As shown therein, each row line 20 is connected to a reference voltage source 22 (preferably through a switch). Prior to the actual vector-matrix multiplication, the horizontal lines or row electrodes of the DCSD elements 23 are preset to a fixed reference voltage and then left floating at that voltage by gating the switch. As is typical in a nondestructive CID imager operation, the column electrodes 30 or vertical lines 24 of the DCSD array are all at a higher potential (deeper well) so that all matrix charges are positioned beneath the column electrodes which constitute the collecting electrodes of the DCSD array. To compute the vector-matrix multiply, these column lines are simultaneously pulsed low if the input vector element they correspond to is "ON". If the vector element is not ON, the column line is kept at a high potential. In this computation, input vectors are binary while matrix elements are analog. If the column line is pulsed low, the column of charge packets of the corresponding matrix elements or pixels are transferred underneath the respective corresponding floating row electrodes, that is, the sensing electrodes. A voltage change proportional to the size of the corresponding matrix charge packet is induced at each row electrode in that column. All appropriate column lines are pulsed at the same time and their voltage changes are capacitively summed (voltage domain) along each floating row line. In this fashion, a single bit of the vector-matrix multiply is computed in a single clock cycle, the result being analog voltage changes on the row lines with each row line corresponding to an output vector element.

A fundamental consequence of using the DCSD structure is the requirement that the input vector to be multiplied be presented in binary format. Ideally however, analog or multivalued inputs are desirable. One way to achieve multivalued inputs with high accuracy is to use a bit-serial technique in the computation. In this technique, the input vector's elements are presented as digital numbers in a 2–12 bit format. The bits are processed by the DCSD vector-matrix multiplier one at a time and input by a plurality of binary shift registers connected respectively to each column line of the DCSD array. The shift registers are each loaded with a set of 2–12 bits of the respective vector elements. The shift register contents are configured so that the least significant bit of each vector element is used in the first vector-matrix multiply operation and the most significant bit thereof is used in the last vector-matrix multiply operation. These bits are processed by the DCSD vector-matrix multiplier one at a time.

Figure 4:
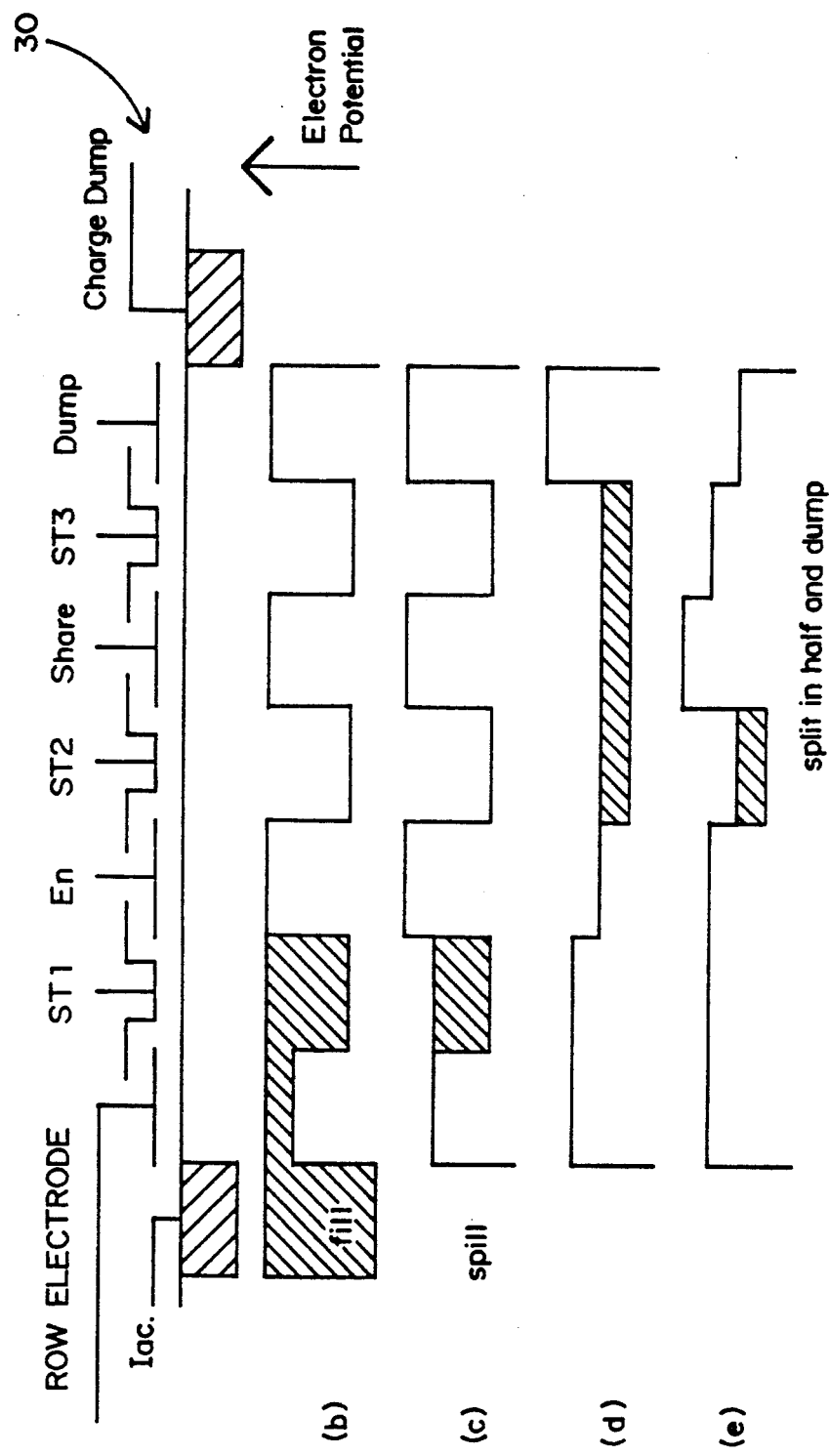
FIG. 4 is an electrode/electron well drawing showing the operation of a divide-by-two/accumulate circuit used in the invention.

In order to account for the increase in the relative value of each multiply operation from the least significant bit of the input vector elements to the most significant bit of the input vector elements, each row line of the DCSD array is provided with a divide-by-two/accumulate CCD circuit 30 shown in FIG. 4. This circuit serves a dual function. One such function is to transform the voltage on the row line into a charge using the well-known "fill and spill" technique. Fill and spill, also known as charge or potential equalibration, is a CCD input technique described, for example, in the text *Charge-Coupled Devices and Their Applications* by Beynon and Lamb, pages 187–188, McGraw-Hill, 1980. This charge packet is then added to the previous bit's result and stored into two wells of equal size on respective sides of a dividing electrode identified as the share electrode in FIG. 4. When the dividing electrode is pulsed low, the charge packet is divided in half and one of the two identical wells is emptied. Consequently, when the next bit is processed and its charge, which is proportional to the new change in row line voltage is added to the well, the result of the previous bit's processing has only half of its original magnitude. Therefore, for each subsequent bit of the input vector, the result of the previous computation is divided in half and accumulated. Repetition of this process for all bits of the input vector results in the reduction of the n'th bit result by a factor of $2^n$. Thus by providing a divide-by-two/accumulate circuit and using a bit serial approach, the binary DCSD vector-matrix multiplier may be used for analog (multivalued) vector-matrix multiplication. This results in an analog output value (charge) for each element of the output vector after n clock cycles (typically 2–12 clock cycles).

Note that there are two separate accumulations occuring. The first involves a vector-matrix multiplication of one bit of the input vector elements and the analog matrix (capacitive accumulation) while the second involves the charge domain accumulation of the output's divide-by-two/accumulate circuit.

Figure 3:
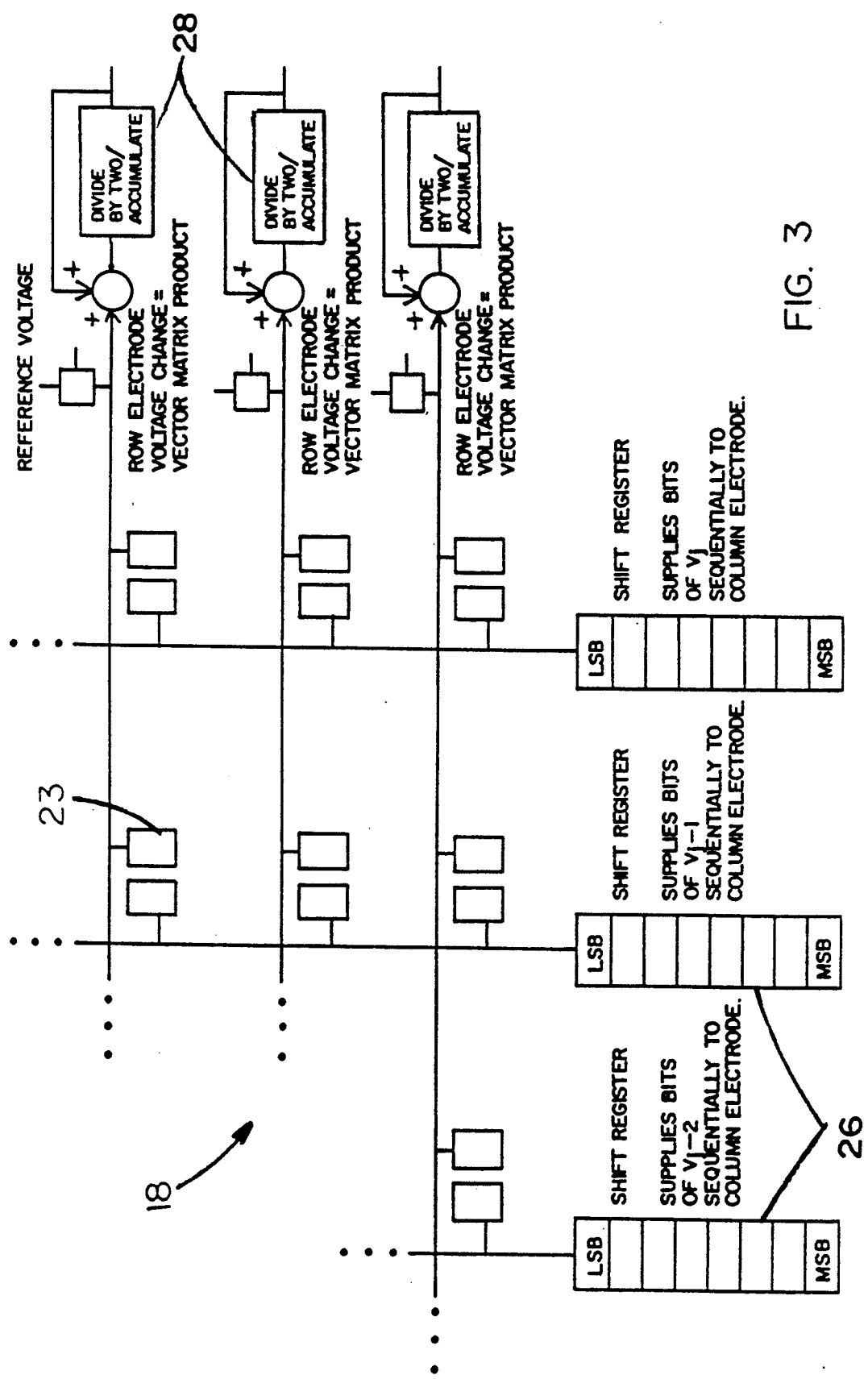
FIG. 3 is a schematic illustration of the analog computation process carried out by the present invention.

The combination of DCSD matrix 18, binary shift registers 26 and divide-by-two/accumulate circuits 28 is shown in FIG. 3. The output voltage change at each row (i) for vector element bit (k) before the divide-by-two/accumulate circuit is:

$$\Delta V_{bit(k)}^{(i)} = \sum_j \frac{Q_{ij} V_j^{(bit\ k)}}{C}$$

where $Q_{ij}$ is the sensed charge at DCSD matrix element ij; $V_j^{(bit\ k)}$ is the vector j'th element (bit k) applied by the shift registers and C is the DCSD row line capacitance relating charge to voltage. This calculation takes one clock cycle. The output of the divide-by-two/accumulate circuit after n clock cycles for each row (i) is:

$$\Delta V_{total}^{(i)} = \sum_{k=0}^{n-1} \frac{\Delta V_{bit(k)}^{(i)}}{2^{n-K-1}}$$

where n is the number of bits in the input vector elements.

For the multiply cells of the present invention to be compatible with one another so that they can be used in multilayer neural networks and standard digital applications, the output vector must be of the same format as the input vector, namely, digital. To accomplish this, one may use an analog-to-digital converter that converts the charge packet results into a digital string compatible with the digital a configuration of the input vector, namely, 2-12 bits. Such analog-to-digital converters allow the chip to appear to the outside world to be digital, thereby permitting the use of standard digital memory elements and communication methods in implementations and obviating any requirement for fast external analog multiplexing and storage of the input and output vectors.

Figure 5:
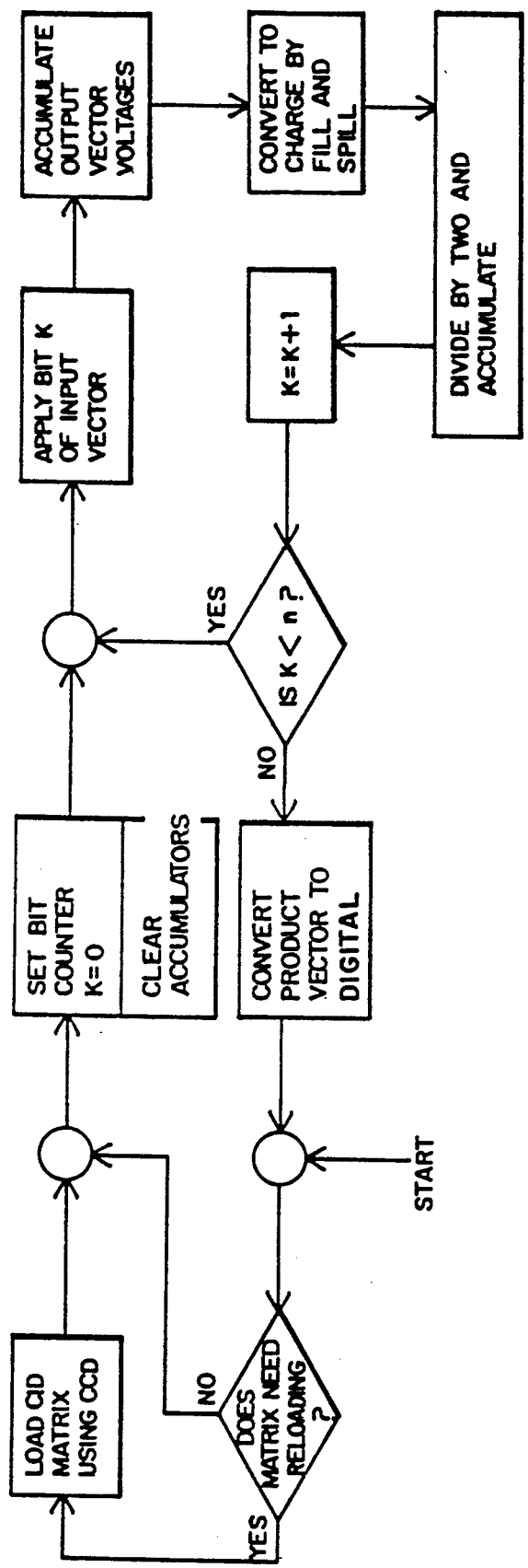
FIG. 5 is a block diagram representation of the process steps of the invention.

Referring to FIG. 5, it will be seen that the process of the present invention may be preferably carried out by performing the following major steps:
 a) loading a distributed charge sensing device with a plurality of charges corresponding to a matrix of analog values;
 b) applying a plurality of input vector elements in binary form to the control or column lines of said distributed charge sensing device;
 c) accumulating a plurality of output vector elements in analog voltage format at the sensor or row lines of said distributed charge-sensing device;
 d) converting the analog voltage format to a charge format using fill and spill;
 e) altering the output vector elements to compensate for the relative change in value of the input vector element bits; and
 f) converting the analog charge format of the output vector elements into a binary form.

The preferred charge loading is performed by a CCD sharing at least one electrode with the DCSD. The preferred vector element applying step uses a binary shift register. The preferred manner of altering the output to compensate for bit value changes is to divide-by-two and feedback to accumulate so that the n'th bit result is reduced by a factor of $2^n$; and the preferred analog charge conversion is implemented with an analog-to-digital converter.

In contemplated preferred embodiments of the present invention the size of each DCSD/CCD connection is about 25 $\mu$m by 25 $\mu$m using 2 $\mu$m CCD/CMOS technology. These cells use aluminum interconnect lines for the row and column electrodes of the DCSD portion, thereby providing a substantial speed advantage over conventional all polysilicon CIDs. With such aluminum lines the anticipated switching speed of the device is about 10 MHz. for an array of 324×324 DCSD/CCD connections on a 1 cm$^2$ chip. This 10 MHz. rate is the binary rate. For bit serial operation at 2-12 bits input accuracy, the calculation would be 2-12 times slower or between 5 MHz. and 0.83 MHz.

The electrical loading of the DCSD matrix by means of the CCD array may be accomplished through a single pin in about 4 milliseconds and it is anticipated that the charge array will need to be refreshed every 20-40 milliseconds thereby resulting in a refresh overhead of only 10-20 percent. Thus, for an individual chip with digital input/output and an accuracy of 8 bits, there are 100,000 connections operating at about 1 MHz., which corresponds to an estimated rating of $10^{11}$ connections per second with 8 bit accuracy using only standard technology, relatively small die areas and no special analog interface circuits.

Although the present invention has been described for use primarily in neural network applications, it should be understood that a chip which computes a vector/matrix multiply with 2-12 bit digital accuracy is useful for signal processing tasks other than neural networks. By way of example, the discrete Fourier transform (DFT) function can be implemented easily with a single DCSD/CCD chip of the type herein described providing digital throughput of 300-400 megabytes per second. A 324 point DFT takes just one microsecond, a significant improvement in performance over a dedicated digital hardware currently known and costing orders of magnitude more and using far more space and power than the invention described herein. The present invention also provides the speed and accuracy necessary for real time video signal processing. Improved definition television systems can be built for operating on standard NTSC video (740×480 pixels) to create high definition signals (1480×960 pixels) for display on state-of-the-art monitors in real time. Networks using the DCSD/CCD processor of the present invention can be used to actively demodulate and interpolate, enhance edges and provide proper shading and noise reduction for standard video signals at low cost.

The high accuracy and speed of the CCD/DCSD vector matrix multiplier of the present invention are unparalleled at this time. The fastest digital (or analog) processors on either single chip or in costly large system configurations, are still orders of magnitude inferior in performance and higher in cost. Potential applications include neural network theory modelling, fast Fourier analysis and real-time video signal processing.

It will now be understood that what has been disclosed herein comprises a charge domain bit serial vector matrix multiplier for real time signal processing of mixed digital/analog signals with high speed and high accuracy for implementing optoelectronic neural networks and other signal processing functions. A novel combination of CCD and DCSD arrays permits vector/matrix multiplication with better than $10^{11}$ multiply accumulates per second on a one square centimeter chip. The CCD array portion of the invention is used to load and move charge packets into the DCSD array for processing therein. The DCSD array is designed to store a plurality of charge packets representing the respective matrix values such as the synaptic interaction matrix of a neural network. The input vector may be applied in bit serial format using 2-12 bit shift registers connected to each of the column or collector lines of the DCSD array. The row or sensor lines of the DCSD array are used to capacitively accumulate the results of the vector-matrix multiply operation. Each such row output electrode is provided with a charge domain divide-by-two/accumulate CCD circuit which allows the device to automatically compensate for the increasing value of the input vector elements from least significant bit to most significant bit. The accumulated charge packet output of the array may be preferably converted to a digital signal compatible with the input vector configuration by utilizing a plurality of analog-to-digital converters.

Those having skill in the art to which the present invention pertains will now, as a result of the applicants' teaching herein, perceive various modifications and additions which may be made to the invention. By way of example, specific semiconductor materials, specific array geometries, specific cell layouts, matrix configurations, chip architecture, timing and throughput rates may be readily altered as the state of the art of semiconductor fabrication changes, or as the need for specific multiply and accumulate operations may be altered for different applications. By way of further example, the cell layout may employ different numbers of electrodes per cell such as three, four or five and three polysilicon layers for higher density arrays. Additional substrate implants may be used. Furthermore, the CCD phase structure may be different from what is shown herein in the preferred embodiments. Accordingly, all such modifications and additions are deemed to be within the scope of the invention which is to be limited only by the claims appended hereto.

We claim:

1. An apparatus for computing accumulated vector matrix multiplication products; the apparatus comprising:
   a distributed charge sensing device array having a plurality of charge transfer elements, each such element being adapted to store an electric charge in accordance with the electric potentials applied to column and row lines defining the location of an element, the electric charges stored by the respective elements defining the values of said matrix;
   means for applying a series of digital representations of said vector to the column lines of said distributed charge-sensing device array, said digital representations being serially clocked sequentially to said column lines one clock cycle after another, least significant bit first and most significant bit last;
   means for repeatedly sensing the voltage changes on each said row line for said vector digital bits, each of said voltage changes being proportional to the sum of the products of all of said respective vector digital bits applied to said respective column line and the matrix elements located along said row line;
   means for converting each said sensed voltage charge on each said row line into an output charge, each said output charge being proportional to said respective sensed voltage charge; and
   means for dividing each said output charge from each said row line in half and means for accumulating said halved output charges for the entire series of multiplied vector digital bits;
   whereby at each said clock cycle, said voltage change on each said row line corresponds to the sum of multiplication products of all applied vector bits and the respective matrix elements.

2. The apparatus recited in claim 1 further comprising:
   means for converting the accumulated and divided output charges for all vector digital bits into an output vector sum in digital form.

3. The apparatus recited in claim 1 wherein said applying means comprises a plurality of serial bit shift registers, respective ones of said shift registers being connected to respective ones of said column lines.

4. The apparatus recited in claim 1 wherein said dividing means comprises a plurality of charge-coupled device fill and spill circuits, respective ones of said circuits being connected to respective ones of said row lines.

5. The apparatus recited in claim 2 wherein said charge to digital converting means comprises a plurality of analog-to-digital converters, respective ones of said converters being connected to respective ones of said fill and spill circuits.

6. The apparatus recited in claim 1 further comprising a charge-coupled circuit for loading and emptying electric charges in said distributed charge sensing device.

7. The apparatus recited in claim 6 wherein said charge-coupled circuit comprises a multiple-phase circuit having electrodes for sequentially moving said electric charges therethrough.

8. The apparatus recited in claim 7 wherein two of said electrodes also comprise the column and row lines, respectively, of said distributed charge sensing device array.

9. The apparatus recited in claim 7 wherein said charge-coupled circuit comprises an optical detector for optically loading said electric charges.

10. An electronic integrated circuit for computing multiply and accumulate operations between an analog matrix and digital vectors; the integrated circuit comprising:
    a distributed charge sensing device for storing an array of charges representative of said analog matrix;
    means for calculating vector-matrix multiply operations creating analog output products;
    a plurality of serial binary shift registers for sequentially applying individual bits of said digital vectors to said distributed charge sensing device;
    means for accumulating the analog output products of said distributed charge sensing device while automatically accounting for the relative value of the individual bits of said vectors; and
    wherein said accumulating means comprises a divide-by-two/accumulate circuit for reducing the multiplication results of the n'th input vector bit by a factor of $2^n$.

11. An electronic integrated circuit comprising:
    a distributed charge sensing device for storing an array of predetermined electrical charges;
    a charge-coupled device for loading or emptying said charges in said charge-injection device;
    a plurality of serial bit shift registers for applying digital signals to said charge-injection device;
    wherein said shift registers are configured for applying to said distributed charge sensing device the least significant bit of said digital signals first and the most significant bit of said digital signals last;
    means for accumulating the outputs of said distributed charge sensing device while compensating for the increase in relative significance of each bit applied by said shift registers; and
    wherein said accumulating and compensating means comprises a plurality of divide-by-two/accumulate circuits.

12. A method of performing a vector-matrix multiplication using charge domain integrated circuits; the method comprising the steps of:
    a) loading a distributed charge sensing device with a plurality of charges corresponding to a matrix of analog values;
    b) applying a plurality of input vector elements in digital form to the column lines of said distributed charge sensing device;
    c) accumulating a plurality of output vector elements in analog voltage format at the row lines of said distributed charge sensing device;
    d) altering the output vector element to compensate for the relative change in value of the input vector element bits; and
    e) accumulating the altered output vector elements;
    f) repeating steps b) through e) n times where n is the number of bits in each of said input vector elements; and
    g) converting the analog format of the output vector elements into a binary form.

* * * * *